United States Patent Office 3,278,516
Patented Oct. 11, 1966

3,278,516
WATER-SOLUBLE AZO DYESTUFFS
Otto Scherer, Bad Soden, Taunus, and Klaus Uhl, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Nov. 24, 1964, Ser. No. 413,646
Claims priority, application Germany, Nov. 27, 1963,
F 41,381
6 Claims. (Cl. 260—163)

The present invention relates to water-soluble azo dyestuffs and to a process for preparing them; in particular it relates to water-soluble azo dyestuffs corresponding to the general Formula 1

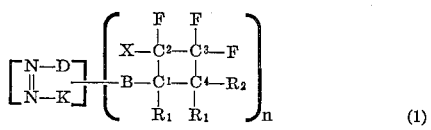
(1)

in which D represents the radical of a diazo component, K represents the radical of a coupling component. D and/or K may contain one or several groups imparting solubility in water, for instance sulfonic acid groups or carboxylic acid groups, and one or several azo groups; $R_1$ and $R_2$ represent hydrogen or chlorine atoms or carboxylic acid groups, cyano groups, nitro groups or sulfonic acid groups or the groupings —R', —OR', —COOR''', —SO$_2$NR'R''
—SO$_2$—R' or —CO—NR'R'' and the two substituents $R_1$ together represent a further carbon linkage between the carbon atoms $C_1$ and $C_4$. In the above-mentioned groupings R' and R'' stand for hydrogen atoms or alkyl or aryl groups, R''' represents an alkyl group or an aryl group, X stands for hydrogen or a halogen atom, preferably a fluorine or chlorine atom, B represents one of the groups —CO—NR'—, —SO$_2$—NR'—,
—CH=CH—CO—NR'— and
—CHR'—CHR''—CO—NR'—; R' and R'' have the meanings given above, n stands for an integer in the range from 1 to 5.

Now we have found that interesting, water-soluble azo dyestuffs of the afore-mentioned general Formula 1 can be prepared by coupling the diazonium compound of a primary aromatic amine of the general Formula 2

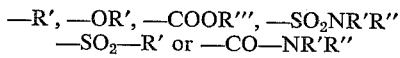
(2)

with an azo component of the general Formula 3

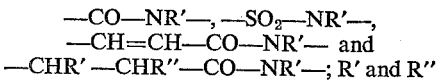
(3)

in which $m_1$ and $m_2$ represent the numbers from 0 to 5—the sum of $m_1+m_2$ being at least 1 and at most 5—D, K, $R_1$, $R_2$, X and B have the meanings given above, at a temperature between about 0° C. and about 120° C., preferably between about 10° C. and about 80° C., in an aqueous or aqueous-organic medium, at a pH-range between about 3 and 10, preferably between about 5 and 8.5.

The most favorable temperature to be applied for the coupling in each individual case and the pH-range to be maintained have to be adjusted to the reactants used, especially to the azo components. Whether the diazo and the azo component are combined in a purely aqueous or in an aqueous-organic medium likewise depends on the compounds to be coupled, for example, on their properties of solubility.

The diazonium compounds of the primary amines of the general Formula 2 are prepared in known manner at temperatures between about —10° C. and about +30° C., preferably between about 0° C. and about 20° C., in an aqueous solution, in a pH-range of about 1 to about 4, suitably with the use of a sodium nitrite solution about 0.5 N to about 8 N, preferably about 1 N to about 5 N. The most favorable temperature to be applied in each individual case depends upon the reactants used.

The primary aromatic amines on which the diazo components to be reacted according to the process of the present invention are based are derived, for their greater part, from the benzene and naphthalene series. As individual amines there are mentioned, for example, aminobenzene, 1 - amino - 2 - methylbenzene, 1 - amino-3-methylbenzene 1-amino-2,5-dimethylbenzene, 1-amino-2-methoxybenzene, 1 - amino-3-methoxybenzene, 1-amino-2,5-dimethoxybenzene, 1-amino-3-methyl-6-methoxybenzene, 1-aminobenzene-2-sulfonic acid, 1-aminobenzene-3-sulfonic acid, 1-aminobenzene-4-sulfonic acid, 1-aminobenzene-2,5-disulfonic acid, 1-trifluormethyl-3-aminobenzene-6-sulfonic acid, 1-methyl-2-chloro-5-aminobenzene-4-sulfonic acid, 1-methyl-2-chloro-4-aminobenzene-5-sulfonic acid, 1-amino-3-acetylaminobenzene-6-sulfonic acid, 1-amino-4-acetylamino-benzene-2-sulfonic acid, 1-amino-3,4-dichloro-benzene-6-sulfonic acid, 1-amino-2,4-dimethoxybenzene-6-sulfonic acid, 1-methyl-4-amino-5-sulfonic acid, 1-methyl-3-aminobenzene-4-sulfonic acid, 1-methoxy-4-aminobenzene-5-sulfonic acid, 1-methoxy-3-amino-4-sulfonic acid, 1-hydroxy-4-aminonaphthalene-3-sulfonic acid, 1-aminonaphthalene-6-sulfonic acid, 1-aminonaphthalene-7-sulfonic acid, 1-amino-naphthalene-4-sulfonic acid, 1-amino-2-hydroxynaphthalene-4-sulfonic acid, 2-aminonaphthalene-3,6-disulfonic acid, 1-(2',2',3',3'-tetrafluorocyclobutyl-carbonylamino) - 4 - aminobenzene-5-sulfonic acid, 1 - (1' - chloro-2',2'3',3'-tetrafluoro-cyclobutyl-carbonylamino)-4-aminobenzene-5-sulfonic acid, 1-(β-2',2', 3',3'-tetrafluoro-cyclobutyl-acryloylamino) -4- aminobenzene-5-sulfonic acid, and 1-(2'-chloro-2',3',3'-trifluorocyclobutyl-carbonylamino) - 4 - aminobenzene-5-sulfonic acid.

Coupling components to be used according to the process of the present invention are aromatic hydroxy compounds coupling in o-position to a hydroxy group and aliphatic or heterocyclic, enolised or enolisable hydroxy compounds, and, moreover, amines coupling in p-position to the amino group. As compounds of this kind there are named, for instance, phenol, methoxybenzene, 1-hydroxybenzene-2-sulfonic acid, 1-hydroxybenzene-3-sulfonic acid, 1-hydroxybenzene-4-sulfonic acid, 1-amino-3-hydroxynaphthalene-4-sulfonic acid, 1-amino-3-hydroxynaphthalene-6-sulfonic acid, 1-amino-5-hydroxynaphthalene-6-sulfonic acid, 1 - amino - 5 - hydroxynaphthalene-7 - sulfonic acid, 1 - amino - 8 - hydroxynaphthalene - 3,6-disulfonic acid, 2-hydroxynaphthalene-6,8-disulfonic acid, 2-hydroxynaphthalene-3,6-disulfonic acid, 1,8-dihydroxynaphthalene-3,6-disulfonic acid, 1-amino-8-hydroxynaphthalene-4-sulfonic acid, 2-amino-8-hydroxynaphthalene - 6 - sulfonic acid, 3-amino-8-hydroxynaphthalene-6- sulfonic acid, 1-acetylamino-8-hydroxynaphthalene-3,6-disulfonic acid, 3 - methyl-1-(4'-sulfophenyl)-pyrazolone-(5), 1-(4'-sulfophenyl)-5-pyrazolone-3-carboxylic acid, acetoacetylamino - benzene, 1-acetoacetylamino-2-chlorobenzene, 1 - methyl - 4 - acetoacetylamino-benzene, 1,4-dimethoxy - 2 - acetoacetylamino - 5 - chlorobenzene, 1-(2',2',3',3' - tetrafluorocyclobutyl - carbonylamino) - 8-hydroxynaphthalene-3,6-disulfonic acid, 1-(β-2',2',3',3'-tetrafluorocyclobutyl - acryloylamino)-8-hydroxynapthalene-3,6-disulfonic acid and 1-(1'-chloro-2',2',3',3'-tetrafluorocyclobutyl - carbonylamino)-8-hydroxynaphthalene-3,6-disulfonic acid.

To carry out the process in an aqueous-organic medium, water-soluble, inert organic solvents, such for instance, as acetone, dimethyl-formamide, lower alkanols, glycols or dioxane are used.

On cellulose and protein fibers the dyestuffs obtained according to the process of the present invention produce dyeings of good to very good resistance to washing.

The following examples serve to illustrate the invention but they are not intended to limit it thereto, the parts and percentages being by weight unless otherwise stated, the relationship of parts by weight to parts by volume being the same as that of the kilogram to the liter.

*Example 1*

10.5 parts of 1 - (2',2',3',3' - tetrafluorocyclobutyl-carbonylamino)-4-aminobenzene - 3 - sulfonic acid (obtained by reaction of 2,2,3,3,-tetrafluorocyclobutane-carboxylic acid chloride with 1,4-diaminobenzene-3-sulfonic acid sodium at pH 7.5 to 8) are dissolved in 16 parts by volume of 2 N-sodium carbonate solution and 34 parts by volume of water. 32 parts by volume of a normal sodium-nitrite solution are added. This batch is then added to a mixture of 50 parts of volume of 2 N-hydrochloric acid and 20 parts of ice, while stirring and applying external cooling so that the temperature does not exceed 15° C.

14 parts of an aqueous solution of 81% strength of 1-acetylamino-8-hydroxy-naphthalene - 3,6 - disulfonic acid are suspended in 20 parts of water, dissolved by dropwise adding a 2 N-sodium carbonate solution, and the solution is adjusted to pH 8 by adding some further drops of the sodium carbonate solution. For the buffering of the solution 20 parts of sodium acetate are added. To this solution the diazonium salt solution is added in one portion at 20° C. Stirring is continued for 1 hour at room temperature and steam is then introduced for 30 minutes into the solution. After salting out with sodium chloride, 22 parts of the dyestuff of the formula

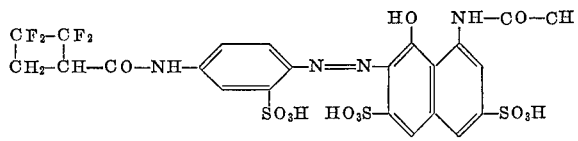

are obtained.

2 parts of a cotton fabric are introduced into 10 parts by volume of a solution of 2 parts of the above-mentioned dyestuff in 100 parts of water. 10 parts by volume of a 2 N-sodium carbonate solution are added to this dyebath. The bath is then heated for some minutes on the steam bath. The dyed cotton fabric is then treated at the boil for 5 minutes, each time, twice with 20 parts by volume of water and once with 20 parts by volume of an aqueous solution of 2% strength of a synthetic detergent. A violet-tinged red dyeing is obtained which excellently resists to wetting.

*Example 2*

If instead of the 10.5 parts of 1-(2',2',3',3'-tetrafluorocyclobutyl - carbonylamino) - 4-aminobenzene-3-sulfonic acid mentioned in Example 1, 12.4 parts of 1-(1'-chloro-2',2',3',3' - tetrafluoro - cyclobutyl - carbonylamino) - 4 - aminobenzene-3-sulfonic acid (obtainable by reaction of 1 - chloro-2,2,3,3-tetrafluoro-cyclobutane-carboxylic acid chloride with 1,4-diaminobenzene-3-sulfonic acid sodium at pH 7.5 to 8) are used, and the further treatment is realized as described in Example 1, 23.2 parts of the dyestuff corresponding to the formula

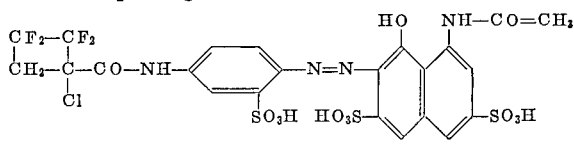

are obtained. When dyeing a cotton fabric according to the dyeing process described in Example 1, a violet-tinged red dyeing is obtained which is excellently resistant to wetting.

*Example 3*

If instead of the diazo component mentioned in Example 1, 12.0 parts of 1-(β-2',2',3',3'-tetrafluorocyclobutyl-acryloylamino)-4-aminobenzene-3-sulfonic acid are used (obtainable by reaction of a solution of β-2',2',3',3'-tetrafluorocyclobutane-acrylic acid chloride in acetone with 1,4-diaminobenzene-3-sulfonic acid sodium at pH 7.5 to 8), and by further proceeding as described in Example 1, 20.8 parts of the dyestuff of the formula

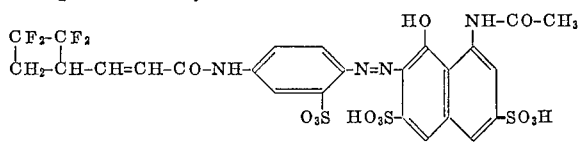

are obtained.

When applying the dyeing process described in Example 1 the dyestuff produces on cotton fabrics a violet-tinged red dyeing of excellent resistance to wetting.

*Example 4*

By using instead of the diazo component mentioned in Example 1, 11.5 parts of 1-(2'-chloro-2',3',3'-trifluoro-cyclobutyl - carbonylamino) - 4-aminobenzene-3-sulfonic acid (obtainable by reaction of 2-chloro-2,3,3-trifluoro-cyclobutane-carboxylic acid chloride with 1,4-diaminobenzene-3-sulfonic acid sodium at pH 7.5 to 8) and proceeding, for the rest, as described in Example 1, 18.9 parts of the dyestuff of the formula

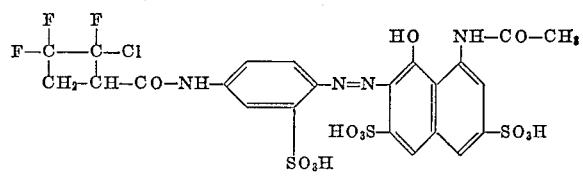

are obtained. On a cotton fabric the dyestuff produces a violet-tinged red dyeing of excellent wet-fastness.

*Example 5*

When using as diazo component 10.5 parts of 1-(2',2',3',3' - tetrafluorocyclobutyl-carbonylamino)-4-aminobenzene-3-sulfonic acid and as azo component 3.2 parts of resorcinol and proceeding, for the rest, as described in Example 1, 10.1 parts of the dyestuff of the formula

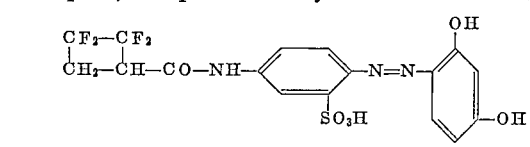

are obtained. On a cotton fabric the dyestuff produces an orange dyeing of good fastness to wetting.

*Example 6*

By using as diazo component 10.5 parts of 1-(2',2', 3',3' - tetrafluorocyclobutyl-carbonylamino)-4-aminobenzene-3-sulfonic acid and as azo component 9.5 parts of 3-methyl-1-(4'-sulfophenyl)-pyrazolone-(5) (purity degree 81%) and proceeding as described in Example 1, 18.3 parts of the dyestuff of the formula

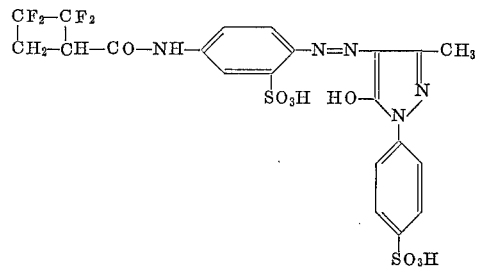

are obtained.

On a cotton fabric the dyestuff produces a reddish yellow dyeing of very good fastness to wetting.

*Example 7*

10.5 parts of 1-(2',2',3',3'-tetrafluorocyclobutylcarbonylamino)-4-aminobenzene-3-sulfonic acid are diazotized as described in Example 1 and coupled with 7 parts of aceto-acetic acid anilide dissolved in 60 parts by volume of ethanol and 40 parts of water, whereby 15.5 parts of the dyestuff of the formula

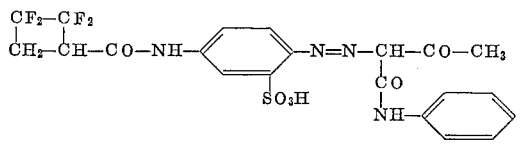

are obtained.

On cotton fabrics the dyestuff produces a greenish yellow dyeing of good fasteness to wetting.

*Example 8*

8.65 parts of 1-aminobenzene-4-sulfonic acid are dissolved in 25 parts by volume of 2 N-sodium carbonate solution and 25 parts by volume of water. 50 parts by volume of 1 N-sodium nitrite solution are added to the solution obtained. The batch is then added, while stirring, to a mixture of 62.5 parts by volume of 2 N-hydrochloric acid and 50 parts by volume of ice.

22.85 parts of 1 - (2',2',3',3'-tetrafluorocyclobutylcarbonylamino)-8-hydroxynaphthalene-3,6-disulfonic acid (obtained by conversion of the 1-amino-8-hydroxynaphthalene-3,6-disulfonic acid present in the form of an aqueous suspension, into the water-soluble disodium salt by dropwise adding the calculated amount of a 2 N-sodium carbonate solution at 50° C., adjusting a pH-value of 7.5 and reacting the above-mentioned disodium salt with 2,2,3,3 - tetrafluorocyclobutane-carboxylic acid chloride while maintaining constant the above-mentioned pH-value) are suspended in 50 parts by volume of water. 2 N-sodium carbonate solution is added to the suspension obtained until the acid is totally dissolved and the pH-value adjusted to 8. Upon addition of 20 parts of sodium acetate the diazo solution prepared according to paragraph 1 is stirred in at 10° C. After terminated addition, stirring is continued for 12 hours at room temperature. Finally, the solution is salted out with sodium chloride, whereby 26.0 parts of the dyestuff of the formula

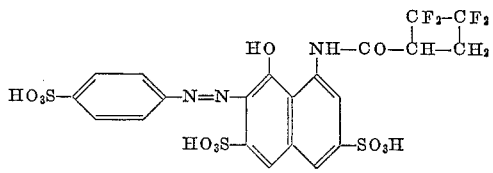

are obtained.

On a cotton fabric the dyestuff produces a bluish red dyeing which shows a good fastness to wetting.

*Example 9*

10 parts of 4-amino-azobenzene are triturated with 25 parts by volume of 2 N-hydrochloric acid, rinsed with 50 parts by volume of water into a container, 37.5 parts by volume of 2 N-hydrochloric acid and 20 parts of ice are added. With external cooling and vigorous stirring 50 parts by volume of normal sodium nitrite solution are dropped in. The diazo solution obtained is filtered and treated for coupling with 22.85 parts of 1-(2',2',3',3'-tetrafluorocyclobutyl-carbonylamino)-8 - hydroxynaphthalene-3,6-disulfonic acid according to the method described in Example 8. 27.1 parts of the diazo dyestuff of the formula

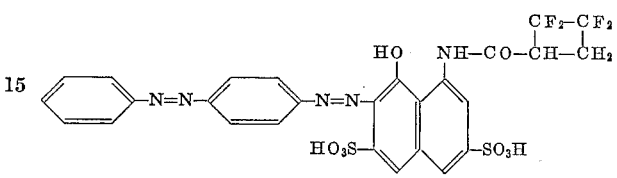

are obtained producing on a cotton fabric a deep violet dyeing of very good fastness to wetting.

*Example 10*

14.15 parts of 1-aminobenzene-3,5-disulfonic acid are dissolved hot in 150 parts by volume of water. The solution obtained is filtered and added, while stirring, to 8 parts by volume of hydrochloric acid of 30% strength by volume. Upon cooling to 0° C. 17.5 parts by volume of sodium nitrite solution of 20 percent strength are added. After 15 minutes 175 parts by volume of ethanol are added to the diazo solution. While carefully stirring a solution of 7.15 parts of α-naphthylamine in 100 parts by volume of water is very slowly added dropwise. Upon standing over night the batch is filtered and the isolated precipitate is dissolved in a solution of 5.3 parts of sodium carbonate in 300 parts by volume of water. The solution obtained is then cooled to 0° C. and filtered. 22 parts by volume of sodium nitrite solution of 20 percent strength are added to the filtrate, and, while thoroughly stirring, the whole is dropped into a mixture of 10° C. consisting of 30 parts by volume of concentrated hydrochloric acid and 150 parts by volume of water. After 2 hours the diazotization is terminated. 117 parts of sodium chloride are then dissolved in the reaction mixture, filtered off and the precipitate obtained is washed with ice-cold aqueous sodium chloride solution of 15% strength. The diazo compound obtained as described above is then coupled according to the method described in Example 8 with 22.85 parts of 1-(2',2',3',3'-tetrafluorocyclobutyl-carbonylamino)-8-hydroxynaphthalene-3,6-disulfonic acid, whereby 28.5 parts of the diazo dyestuff of the formula

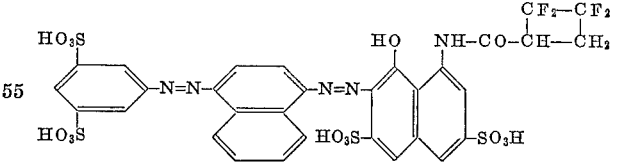

are obtained.

On a cotton fabric the dyestuff produces a blue dyeing of good fastness to wetting.

*Example 11*

6.0 parts of 1-aminobenzene-3-sulfonic acid are suspended in 50 parts by volume of water and then dissolved by dropwise adding 40 parts by volume of 2 N-sodium carbonate solution. 55 parts by volume of 1 N-sodium nitrite solution are added to the solution obtained. The solution is then poured in 1 portion to a mixture of 50 parts by volume of concentrated hydrochloric acid and 25 parts of ice. Stirring is continued again for 10 minutes.

13 parts of 1-(β-2',2',3',3'-tetrafluorocyclobutyl-acryloyl-amino)-8-hydroxynapthalene-3,6-disulfonic acid (obtainable by conversion of the 1-amino-8-hydroxynaphthalene-3,6-disulfonic acid present in the form of an aqueous suspension into the water-soluble disodium salt by dropwise adding the calculated amount of a 2 N-sodium carbonate solution at 50° C., and adjustment of a pH-value of 7.5, reaction of the above-mentioned disodium salt with β-2,2,3,3-tetrafluorocyclobutane-acrylic acid chloride while maintaining the above-mentioned pH-value) are dissolved by means of 35 parts by volume of 2 N-sodium carbonate solution and adjusted to pH 8. 20 parts of sodium acetate are added to the solution obtained. The diazo solution described in paragraph 1 is added in one portion to this solution, the mixture is stirred for 1 hour at room temperature and then for 1 hour at 85° C. By salting out with sodium chloride 14.7 parts of the dyestuff of the formula

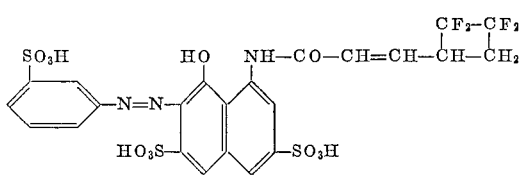

are obtained. On a cotton fabric the dyestuff produces a bluish red dyeing of a good fastness to wetting.

*Example 12*

In the manner described in Example 11, 6.0 parts of 1-aminobenzene-3-sulfonic acid are diazotized and coupled according to the method described likewise in Example 11 with 17.7 parts of 1-(1'-chloro-2',2',3',3'-tetrafluoro-cyclobutyl-carbonylamino)-8 - hydroxynaphthalene-3,6-disulfonic acid (obtained by reaction of the disodium salt of 1-amino-8-hydroxynaphthalene-3,6-disulfonic acid with 1-chloro-2,2,3,3 - tetrafluorocyclobutane-carboxylic acid chloride while maintaining a pH-value of 7.5.). 19.0 parts of the dyestuff of the formula

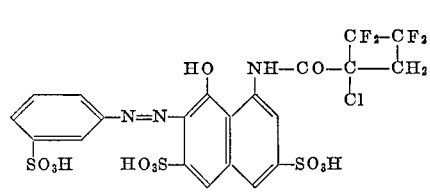

are obtained. On a cotton fabric the dyestuff produces a deep bluish red dyeing showing good fastness to wetting.

*Example 13*

7.3 parts of 1-(β-2',2',3',3'-tetrafluorocyclobutyl-acryloylamino)-4-aminobenzene-3-sulfonic acid are diazotized as described in Example 1 and coupled with 6.3 parts of 3-methyl-1-(4'-sulfophenyl)-pyrazolone-(5) of 81% strength likewise as described in Example 1. 10.8 parts of the dyestuff of the formula

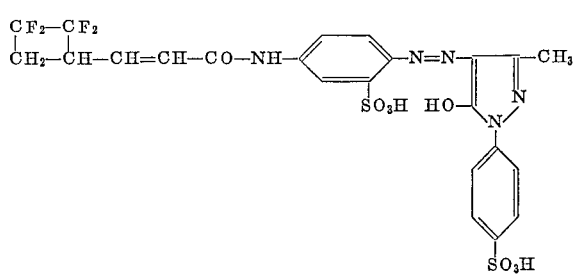

are obtained. On a cotton fabric the dyestuff produces a very deep reddish yellow dyeing of a very good fastness to wetting.

*Example 14*

9.0 parts of 1-aminobenzene-3-sulfonic acid are diazotized as described in Example 11 and coupled as described there with 24.5 parts of 1-(2'-chloro-2',3',3'-trifluorocyclobutyl-carbonylamino)-8 - hydroxynaphthalene-3,6-disulfonic acid (prepared by reaction of the disodium salt of 1-amino-8-hydroxynaphthalene-3,6-disulfonic acid with 2-chloro-2,3,3-trifluorocyclobutane-carboxylic acid chloride at a pH of 7.5). 7.4 parts of the dyestuff of the formula

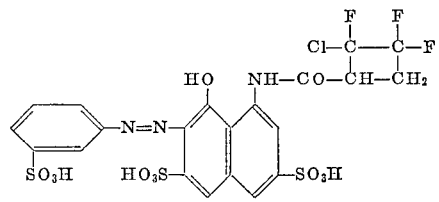

are obtained which on a cotton fabric produces a red dyeing of a good fastness to wetting.

*Example 15*

18.4 parts of 1 - (β-2',2',3',3'-tetrafluorocyclobutylacryloylamino)-4-aminobenzene-3 - sulfonic acid (prepared by reaction of β-2,2,3,3-tetrafluorocyclobutaneacrylic acid chloride in acetone with an aqueous solution of 1,4-diaminobenzene-2-sulfonic acid sodium at a pH-value of 7.5 to 8) are diazotized as described in Example 1 and coupled with 23.65 parts of 1-(2',2',3',3'-tetrafluorocyclobutyl-carbonylamino)-8 - hydroxynaphthalene - 3,6-disulfonic acid as described in Example 1. 44.9 parts of the dyestuff of the formula

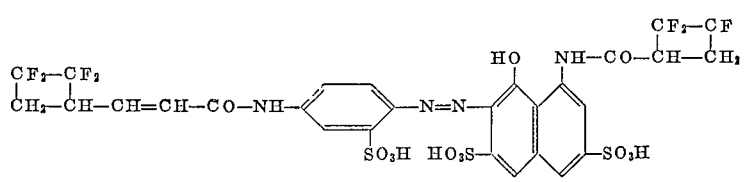

are obtained. On a cotton fabric the dyestuff produces a deep bluish red dyeing of a very good fastness to wetting.

*Example 16*

4.7 parts of aminobenzene are dissolved in 62.5 parts by volume of 2 N-hydrochloric acid. After cooling, a small amount of ice is added and 50 parts by volume of a normal sodium nitrite solution are dropped in so that the temperature does not exceed 0° C.

23.6 parts of 1-(2',2',3',3' - tetrafluorocyclobutylcarbonylamino)-8-hydroxynaphthalene-3,6 - disulfonic acid are dissolved by adding 2 N-sodium carbonate solution and the pH-value of the solution is adjusted to 8. 20 parts of crystalline sodium acetate are added. The diazo solution prepared as described in paragraph 1 in added in one portion whereby after salting out with sodium chloride 24 parts of the dyestuff of the formula

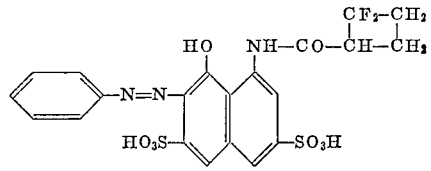

are obtained. On a cotton fabric the dyestuff produces a red dyeing of very good fastness to wetting.

Example 17

50 parts by volume of normal sodium nitrite solution are added to a solution of 8.7 parts of 1-aminobenzene-2-sulfonic acid in 2 N-sodium carbonate solution. 100 parts by volume of 2 N-hydrochloric acid are added to this batch while cooling and stirring. The diazo compound thus formed is coupled as described in Example 16 with 23.6 parts of 1-(2',2',3',3'-tetrafluorocyclobutyl-carbonylamino)-8-hydroxynaphthalene-3,6 - disulfonic acid. After salting out by means of sodium chloride 19.3 parts of the dyestuff of the formula

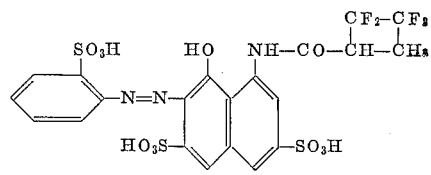

are obtained. On cotton the dyestuff produces a red dyeing showing very good fastness to wetting.

Example 18

To a solution of 8 parts of 2-aminonaphthalene-1-sulfonic acid in 2 N-sodium carbonate solution 37 parts by volume of a normal sodium nitrite solution are added. This batch is then introduced into a mixture of 80 parts by volume of 2 N-hydrochloric acid and 8 parts by volume of a normal sodium carbonate solution at a temperature between 0 and 10° C. The diazo solution thus obtained is coupled with 23.6 parts of 1-(2',2',3',3'-tetrafluorocyclobutyl-carbonylamino)-8 - hydroxynaphthalene-3,6-disulfonic acid in the manner described in Example 16. After salting out with sodium chloride 24.3 parts of the dyestuff of the formula

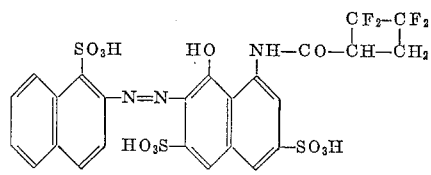

are obtained. On cotton, the dyestuff produces a red dyeing of very good fastness to wetting.

Example 19

22.9 parts of 1-(3'-aminophenyl)-5-pyrazolone-3-carboxylic acid of 91.6% strength are adjusted to pH 8 by means of 2 N-sodium carbonate solution. 21.8 parts of 2,2,3,3-tetrafluoro - 4,4 - dimethylcyclobutane-carboxylic acid chloride-1 in 50 parts by volume of acetone and a further amount of 2 N-sodium carbonate solution are added so that a pH-value between 4 and 6 is maintained.

9.3 parts of aniline, dissolved in 125 parts by volume of 2 N-hydrochloric acid are diazotized with 50 parts by volume of 2 N-sodium nitrite solution at a temperature below 0° C. The diazonium chloride solution thus obtained is then dropped to the azo component prepared as described above, whereby with simultaneous addition of 2 N-sodium carbonate solution a pH-value between 6.5 and 7 is maintained. Stirring is continued for about 1 hour, the mixture is acidified by means of glacial acetic acid and the dyestuff thus obtained corresponding to the formula

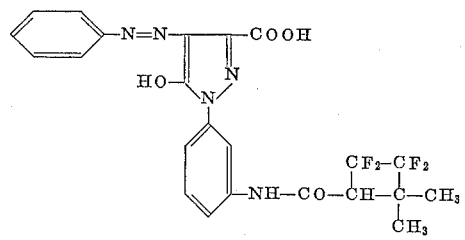

is filtered off. On cotton the dyestuff produces a reddish yellow dyeing of excellent fastness to wetting. If a cotton fabric is printed with a printing paste containing in addition to the dyestuff sodium carbonate as alkaline agent and furthermore acetamide, there is obtained after fixation of the dyestuff in a Mather-Platt ager a reddish yellow print of very good fastness to wetting.

Example 20

10.7 parts of 3-methyl-1-aminobenzene are dissolved in 50 parts by volume of acetone. 24.15 parts of 1,2-dichloro-2,3,3-trifluorocyclobutane-carboxylic acid chloride-1 dissolved in 50 parts by volume of acetone and, simultaneously, aqueous 2 N-sodium carbonate solution are dropped in so that a pH-range of 7.5 to 8 is maintained. 50 parts by volume of water are then added and the solution is acidified by means of hydrochloric acid of 35% strength to arrive at a pH-value of 2. Coupling is carried out with the diazo compound obtained in the usual manner from 30.3 parts of 2-aminonaphthalene-4,8-disulfonic acid in a weakly acid medium, whereby the dyestuff of the formula

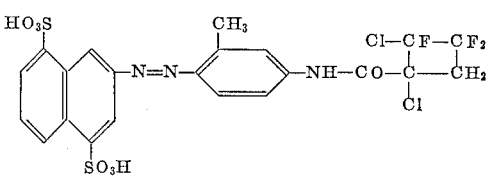

is obtained which after having been subjected to padding and steaming in 2 baths with sodium bicarbonate as alkaline agent, produces a reddish yellow dyeing of good fastness to wetting.

Example 21

26.6 parts of 2-methylamino-5-hydroxynaphthalene-7-sulfonic acid of 94.4% strength are adjusted to a pH-value of 8 by adding 2 N-sodium carbonate solution. 20.7 parts of 2-chloro-2,3,3-trifluorocyclobutane-carboxylic acid chloride in 50 parts by volume of acetone and simultaneously 2 N-sodium carbonate solution is dropped in at an amount such as to maintain the pH range between 4.5 and 6.5. 24.6 parts of 1-aminobenzene-2-sulfonic acid of 72% strength dissolved in 50 parts by volume of a 2 N-sodium carbonate solution are diazotized and 50 parts by volume of 2 N-sodium nitrite solution of 30% strength are added by dropping the mixture into 125 parts by volume of hydrochloric acid of 30% strength and of 0° C. The diazonium salt solution thus obtained is added to the 2 - (2' - chloro - 2',3',3' - trifluorocyclobutyl) - carboxyl-methylamino-5-hydroxynaphthalene-7-sulfonic acid described above, while maintaining a pH-value between 6.5 and 7 by means of 2 N-sodium carbonate solution. Stirring is continued for 1 hour, the solution is acidified with a small amount of glacial acetic acid and the dyestuff of the formula

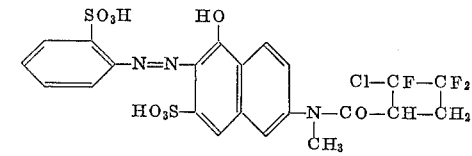

is filtered off. On cellulose materials the dyestuff produces a reddish orange dyeing of very good fastness to wetting.

By printing a staple fiber fabric with a neutral printing paste and treating the printed goods for a short time at about 95° C. in an alkaline bath containing sodium carbonate and sodium chloride, an orange print is obtained which shows good fastness to wetting.

Example 22

20 parts of 1,4-diaminobenzene-2-sulfonic acid of 94% strength are adjusted to a pH-value of 8 by means of aqueous 2 N-sodium carbonate solution. At room temperature 21.7 parts of 3-(2'-chloro-2,3,3-trifluorocyclobutyl)-acrylic acid chloride in 50 parts by volume of acetone are dropwise added and by simultaneously introducing a further amount of 2 N-sodium carbonate solution the pH-value is maintained between 7.5 and 8. After addition of 50 parts by volume of 2 N-sodium nitrite solution the mixture is dropped into 60 parts by volume of concentrated hydrochloric acid in 65 parts by volume of water while cooling to such a degree as to prevent the temperature from exceeding 3° C. In a reaction vessel 27.2 parts of 1-phenyl-3-methyl-5-pyrazolone-4'-sulfonic acid are adjusted to pH 8 by means of 2 N-sodium carbonate solution and 30 parts of sodium acetate are added. The above-mentioned diazonium compound is then dropwise added at temperatures between 0° C. and 10° C., the mixture is stirred for about 1 hour, acidified by means of glacial acetic acid, 100 parts of sodium chloride are added and the dyestuff formed which corresponds to the formula

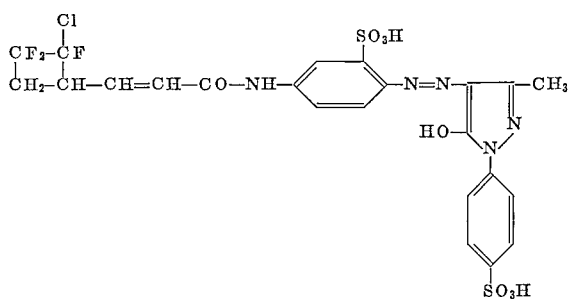

is filtered off. On cellulose material and according to the padding and winding up-process the dyestuff produces with the aid of sodium hydroxide as alkaline agent, a reddish yellow dyeing of excellent fastness to wetting.

*Example 23*

23.8 parts of 1,3-diaminobenzene-6-sulfonic acid of 80% strength are reacted as described in Example 22 with 19.1 parts of 2,2,3,3-tetrafluorocyclobutane-carboxylic acid chloride-1, diazotized and coupled with 26.3 parts of 2-hydroxynaphthalene-3-carboxylic acid anilide. The dyestuff of the formula

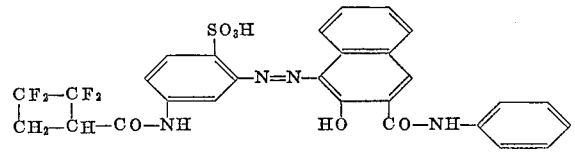

is obtained which on cellulose materials by means of the exhaust process with sodium carbonate as alkaline agent at 25° C. produces red dyeings of good fastness to wetting.

*Example 24*

10.7 parts of 3-methyl-1-aminobenzene are dissolved in 50 parts by volume of acetone and 21.7 parts of 3-(2',2',3',3'-tetrafluorocyclobutyl)-acrylic acid chloride dissolved in 50 parts by volume of acetone are added. Simultaneously, aqueous 2 N-sodium carbonate solution is dropwise added so that a pH-value of 7.5–8 is maintained. The mixture is then acidified by means of a small amount of glacial acetic acid, buffered with solid sodium acetate and coupled with the diazo compound obtained in known manner from 35.7 parts of 4-amino-1,1'-azobenzene-3,4'-disulfonic acid. The disazo dyestuff formed which corresponds to the formula

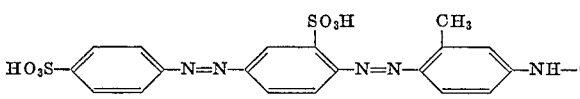

produces on cotton in an alkaline bath yellow-brown shades of very good fastness to wetting.

By printing a cotton fabric with a printing paste containing in addition to the above-mentioned dyestuff sodium carbonate as alkaline agent and subjecting it to fixation by heat at 190° C., a yellow-brown print of excellent resistance to wetting is obtained.

*Example 25*

18.8 parts of 1,4-diaminobenzene-2-sulfonic acid are dissolved in 2 N-sodium carbonate solution until a pH-value of 8 is reached. At 15–20° C. 24.7 parts of 4-isobutyl-2,2,3,3-tetrafluorocyclobutane-carboxylic acid chloride are dropwise added and simultaneously further amounts of 2 N-sodium carbonate solution so that during the reaction a pH-value of 6.5 to 7.5 is maintained. 100 parts by volume of normal sodium nitrite solution are then added to the solution followed by 400 parts by volume of ethyl alcohol. While vigorously stirring, this solution is dropped to 125 parts by volume of 2 N-hydrochloric acid and by external cooling the temperature is maintained at 5 to 10° C. Stirring is continued for 10 to 15 minutes and excessive sodium nitrite which may be present is eliminated by means of a small amount of amidosulfonic acid.

28.4 parts of 1-(4'-sulfophenyl)-5-pyrazolone-3-carboxylic acid are dissolved in 2 N-sodium carbonate solution (pH-value 7 to 8). 30 parts of sodium acetate are added. To this solution the diazo compound prepared as described above is dropwise added and by external cooling a coupling temperature of 5 to 10° C. is maintained. Stirring is continued for a further 12 hours, precipitation is provoked by adding 15 parts of sodium chloride by each 100 parts by volume of reaction solution, and after a further stirring for 6 hours the mixture is filtered. A dyestuff is obtained which in the form of the free acid corresponds to the formula

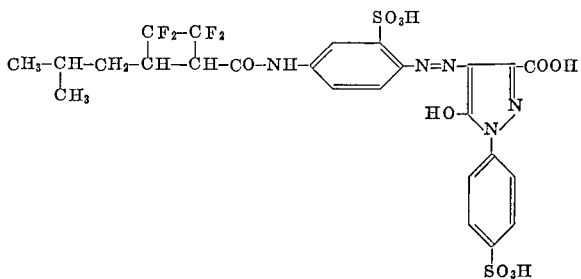

On cotton and when applied from an alkaline solution the dyestuff produces a reddish yellow dyeing of good resistance to wetting.

*Example 26*

A paste is formed by means of 40 parts of 4-nitro-4'-aminostilbene-2,2'-disulfonic acid and 100 parts by volume of water and adjusted to pH 8 by means of the necessary amount of 2 N-sodium hydroxide solution. Water is added until complete dissolution is nearly achieved. 100 parts by volume of normal sodium nitrite solution are then added and the whole is dropped into 125 parts by volume of 2 N-hydrochloric acid which is vigorously stirred. The internal temperature is kept between 5 and 10° C. by external cooling and the mixture is additionally stirred for about 15 minutes. Excessive sodium nitrite which may be present is removed by means of a small amount of amidosulfonic acid.

To a mixture of 10.7 parts of N-methylaniline, dissolved in 50 parts by volume of dioxane and 100 parts by volume of a sodium hydrogen carbonate solution of 9% strength there are dropwise added at 10 to 15° C. 26.8 parts of

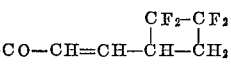

4-phenyl-2,2,3,3-tetrafluorocyclobutane carboxylic acid chloride-1 dissolved in 50 parts by volume of dioxane.

By external cooling the temperature is reduced to 5° C., the mixture is acidified by means of 2 N-hydrochloric acid to pH 2.5 and the diazo substance described above is dropwise added together with saturated sodium acetate solution so that the pH-value amounts to a range between 2.5 and 3. Upon additional stirring for 12 hours 100 parts by volume each of the reaction solution are salted out with 10 parts of sodium chloride, the mixture is filtered and the dyestuff of the formula

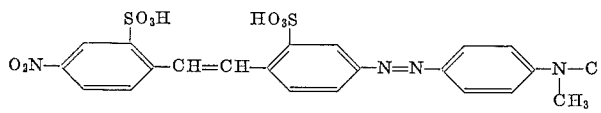 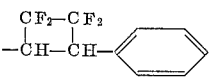

is obtained which when applied from an alkaline bath produces on cellulose materials a reddish yellow dyeing of good fastness to wetting.

*Example 27*

100 parts by volume of water are added to 23.9 parts of 2-amino-5-hydroxy-naphthalene-7-sulfonic acid, and a pH-value of 7.5 is adjusted by means of 2 N-potassium hydroxide solution. At 25–30° C. 24.9 parts of 1-methyl-2,2,3,3 - tetrafluorocyclobutane-carboxylic acid-bromide-1 dissolved in 50 parts by volume of diethylene-glycol-dimethyl ether and simultaneously 2 N-sodium carbonate solution are dropwise added so that a pH-range of 6.5 to 7.5 is maintained. Stirring is continued for 5 minutes and the mixture is cooled to 0–5° C.

30.3 parts of 2-amainonaphthalene-1,7-disulfonic acid are formed to a paste by means of 50 parts by volume of water, and a pH-value of 7.5 is adjusted by means of 2 N-potassium hydroxide solution. 100 parts by volume of normal sodium nitrite solution are added and the mixture is dropped into 125 parts by volume of vigorously stirred 2 N-hydrochloric acid to which shortly before 5 parts by volume of normal nitrite solution had been added. The reaction temperature is maintained in a range between 5 and 10° C. by external cooling. Stirring is continued for a further 15 minutes at 15° C., the excessive nitrite is removed by means of solid amidosulfonic acid and the diazo substance is added in small amounts to the coupling solution prepared as described above, a pH-value of 7 to 8 being maintained by simultaneous addition of 2 N-potassium hydroxide solution and the temperature being maintained at 5 to 10° C. by external cooling. Stirring is continued for a further 6 hours, the mixture is salted out by means of 20 parts of sodium chloride by each 100 parts by volume of reaction solution, the dyestuff is filtered and in the form of the free acid shows the formula

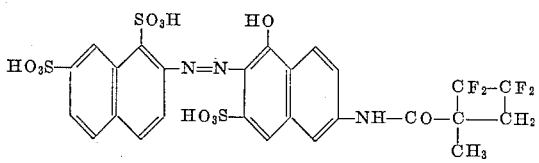

By printing a cotton fabric in the presence of urea and sodium carbonate, subjecting the dyestuff to fixation in the heat at 195° C. and treating it in the usual manner, an orange print is obtained which shows a very good fastness to wetting.

*Example 28*

18.8 parts of 1,3-diaminobenzene-6-sulfonic acid are dissolved in sodium-hydrogen-carbonate solution (pH-value of the solution 7.5) of 9% strength. At 45 to 50° C., 21.7 parts of 3-(2′,2′,3′,3′-tetrafluorocyclobutyl)-acrylic acid chloride, dissolved in 50 parts by volume of acetone are dropwise added and simultaneously further amounts of the sodium-hydrogen-carbonate solution so that a pH-value of 6.5 to 7.5 is maintained during the reaction. 100 parts by volume of normal sodium nitrite solution and 400 parts by volume of ethyl alcohol are then added to the solution. This solution is then dropwise added while vigorously stirring to 125 parts by volume of 2 N-hydrochloric acid. By external cooling the internal temperature is maintained at 5 to 10° C. Stirring is continued for 15 minutes at 10 to 15° C. and the excessive sodium nitrite which may be present is removed with a small amount of solid amidosulfonic acid.

28.4 parts of 1-(4′-sulfophenyl)-5-pyrazolone-3-carboxylic acid are dissolved in sodium hydrogen-carbonate solution of 9% strength (pH-value 7.5) and 30 parts of crystalline sodium acetate are added. The diazo compound prepared as described above is dropwise added and a coupling temperature of 5–10° C. is maintained by external cooling.

Stirring is continued for a further 12 hours, precipitation is provoked by adding 15 parts of sodium chloride per each 100 parts by volume of reaction solution, and after stirring for a further 6 hours the mixture is filtered. A dyestuff is obtained which in the form of the free acid corresponds to the formula

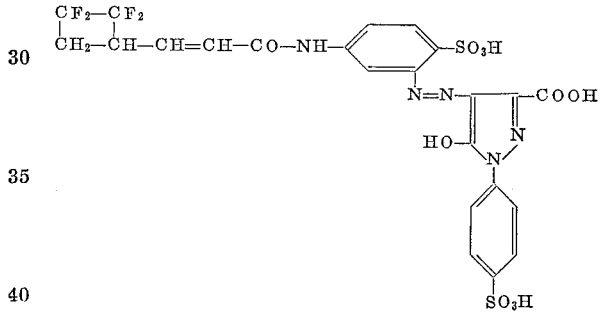

When dyed from a long bath in an alkaline medium on cotton, the dyestuff produces brilliant yellow shades of excellent fastness to wetting.

*Example 29*

50 parts by volume of water are added to 23.9 parts of 2-amino-5-hydroxy-naphthalene-7-sulfonic acid and a pH-value of 8 is maintained by means of 2 N-sodium carbonate solution. The mixture is then heated to 55° C. and 21.7 parts of 3-(2′,2′,3′,3′-tetrafluorocyclobutyl)-acrylic acid chloride, dissolved in 50 parts by volume of acetone, are dropwise added together with 2 N-sodium carbonate solution, so that the pH-value is maintained between 7 and 8. Stirring is continued for a further 10 hours and the mixture is cooled to 5° C.

50 parts by volume of water are added to 17.3 parts of 1-aminobenzene-2-sulfonic acid. 2 N-sodium carbonate solution is then added so that a pH-value of 7 is attained; 100 parts by volume of normal sodium nitrite solution are added and the batch is dropwise added to 125 parts by volume of vigorously stirred 2 N-hydrochloric acid.

The reaction temperature should amount to 5–10° C. Stirring is continued for 15 minutes and excessive sodium nitrite which may be present is removed by adding solid amidosulfonic acid. The diazo solution thus obtained is dropped into the azo component prepared as described above and by simultaneously adding the 2 N-sodium carbonate solution the pH-value is maintained during the coupling operation between 7 and 8. The coupling temperature is maintained at 0 to 5° C. by external cooling. Stirring is continued for 6 hours and the mixture is acidified by means of some drops of glacial acetic acid to pH 5, filtered, washed with a solution of 20 parts of sodium chloride in 100 parts by volume of water, dried to 50° C. A dyestuff is obtained which in the form of the free acid corresponds to the formula

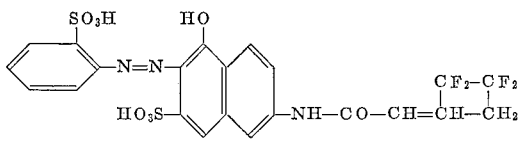

When printing the dyestuff by means of a neutral printing paste on a cotton fabric, and by passing the printed goods through a cold, salt containing, alkaline bath, fixing the dyestuff immediately by steaming in a two-phases steamer, a brilliant orange print of excellent fastness to wetting is obtained on a cellulose fabric.

Example 30

34.1 parts of the monosodium salt of 1-amino-8-hydroxynaphthalene-3,6-disulfonic acid are formed to a paste by means of 50 parts by volume of water, heated to 60–65° C. and adjusted to a pH-value of 7.5 by means of the necessary amount of 2 N-sodium hydroxide solution. At 60–70° C., 21.7 parts of 3-(2′,2′,3′,3′-tetrafluorocyclobutyl)-acrylic acid chloride, dissolved in 50 parts by volume of acetone and simultaneously 2 N-hydroxide solution are added so that the pH-range of 6.5 to 7.5 is maintained. Stirring is continued for 10 minutes, the mixture is then cooled to 0° C. and 30 parts of crystalline sodium-acetate are added.

9.3 parts of freshly distilled aniline are dissolved in 125 parts by volume of 2 N-hydrochloric acid and cooled to −3° C. 100 parts of ice are added and, with vigorous stirring, 100 parts by volume of normal sodium nitrite solution are dropwise added so that the temperature does not exceed 0° C. Stirring is continued at 0° C. for 10 minutes, nitrite traces which may still be present are removed by means of a small amount of solid amidosulfonic acid and the diazo solution is dropped into the coupling component prepared as described above. Care has to be taken for a thorough mixing and the coupling temperature is maintained at −3 to 5° C. by external cooling. Stirring is continued for a further 12 hours, whereby the temperature should slowly rise to room temperature, and the mixture is salted out by means of 20 parts of sodium chloride per each 100 parts by volume of reaction solution. The latter is filtered, washed again with a solution of 20 parts of sodium chloride in 100 parts by volume of water, and dried at 50° C. A dyestuff is obtained which in the form of the free acid corresponds to the formula

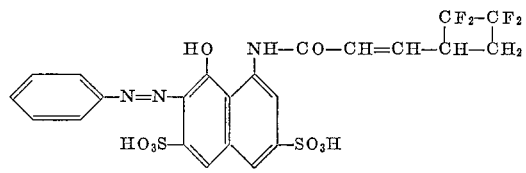

According to the padding and winding up process the dyestuff produces on cellulose fibers bluish red dyeings of excellent fastness to wetting.

Example 31

A paste is formed from 34.1 parts of the monosodium salt of 1-amino-8-hydroxy-naphthalene-3,6-disulfonic acid and 50 parts by volume of water. The paste is heated to 35–40° C. and adjusted to pH 7 by means of the necessary amount of an aqueous solution of trisodium phosphate of 10% strength. At 35 to 45° C., 21.7 parts of 3-(2′,2′,-3′,3′-tetrafluorocyclobutyl)-acrylic acid chloride, dissolved in 50 parts by volume of dioxane and simultaneously further amounts of the trisodium phosphate solution of 10% strength are added so that a pH-value of 6.5 to 7.5 is attained. Stirring is continued for a further 10 minutes and the solution is then cooled to 0° C.

50 parts by volume of water are added to 17.3 parts of 1-aminobenzene-2-sulfonic acid. 2 N-sodium carbonate solution is added so that a pH-value of 7 is attained, 100 parts by volume of normal sodium nitrite solution are added and the batch is dropped into 125 parts by volume of vigorously stirred 2 N-hydrochloric acid. The reaction temperature should amount to 5 to 10° C. Stirring is continued for a further 15 minutes, excessive sodium nitrite which may be present is removed by adding solid amidosulfonic acid.

The diazo solution thus obtained is then dropwise added to the azo component prepared as described above and the pH-value is maintained in a range between 6 and 8 by simultaneously adding ammonia of a density of 0.96. During the coupling the temperature is maintained at 0–5° C. by external cooling. Stirring is continued for 6 hours and a solution of 7.3 parts of monopotassium phosphate in 100 parts by volume of water is added and the mixture is salted out by means of 20 parts of sodium chloride in 100 parts by volume of water. After 12 hours the reaction solution is filtered and dried. A dyestuff is obtained which in the form of the free acid corresponds to the formula

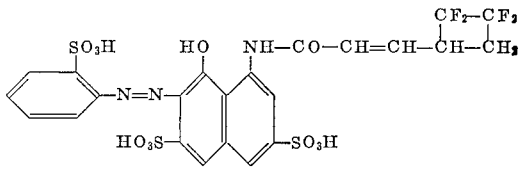

When printing a cotton fabric with a printing paste which in addition to the above-mentioned dyestuff contains sodium carbonate, steaming the printed fabric in a Mather-Platt, rinsing and soaping as usual, a bluish red print of very good fastness to wetting is obtained.

Example 32

A paste is formed from 34.1 parts of the monosodium salt of 1-amino-8-hydroxynaphthalene-3,6-disulfonic acid and 50 parts by volume of water, warmed to 40–45° C., and the required amount of an aqueous solution of trichloroacetic sodium of 10% strength is added in order to adjust the pH-value to 7. At 35–45° C., 21.7 parts of 3-(2′,2′,3′,3′-tetrafluorocyclobutyl)-acrylic acid chloride are dropped into 50 parts by volume of diethyleneglycol dimethyl ether, and simultaneously further amounts of the solution of trichloro-acetic acid sodium of 10° strength, so that a pH-value of 6.5 to 7.5 is maintained. Stirring is continued for a further 10 minutes, the mixture is cooled to 0° C. and, finally, 30 parts of crystalline sodium acetate are added.

A paste is formed from 22.3 parts of 2-aminonaphthalene-1-sulfonic acid in 50 parts by volume of water, dissolved in the required quantity of 2 N-sodium hydroxide solution, and adjusted to a pH-value of 8. 100 parts by volume of normal sodium nitrite solution are added and the whole is dropped into 125 parts by volume of vigorously stirred 2 N-hydrochloric acid to which directly before the dropwise addition 5 parts by volume of normal sodium nitrite solution had been added. The temperature is maintained at 0–10° C. by external cooling, stirring is continued for 15 minutes at 10° C., the excessive sodium nitrite is removed by adding a small amount of solid amidosulfonic acid. The diazo substance is added in small portions to the thoroughly stirred solution of the azo component, and the coupling temperature is maintained at 0 to 5° C. by external cooling. The temperature is then allowed slowly to rise to room temperature, stirring is continued for 12 hours and by means of 20 parts of sodium chloride for each 100 parts by volume of reaction solution a dyestuff is precipitated which in the form of the free acid corresponds to the formula

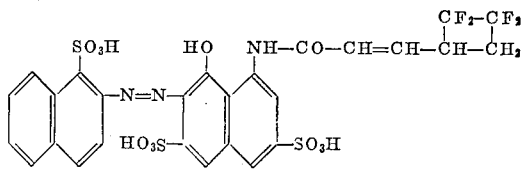

From an alkaline bath according to the padding and steaming process by 2 baths the dyestuff produces on cotton bluish red dyeings which show very good fastness to wetting.

We claim:
1. A water-soluble azo dyestuff of the formula

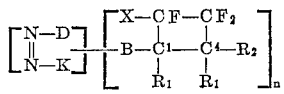

in which D represents phenyl; phenyl substituted by methyl, methoxy, trifluoromethyl, chlorine, acetylamino or phenylazo; naphthyl; naphthyl substituted by hydroxy or phenylazo; or nitrostilbyl; K represents phenyl; phenyl substituted by hydroxy, methyl, methoxy, chlorine or acetylamino; naphthyl; naphthyl substituted by hydroxy or acetylamino; acetoacetic acid anilide; 1-phenyl pyrazolone; or 1-phenyl-3-methyl pyrazolone; at least one of D and K containing at least one sulfonic acid or carboxylic acid group; $R_1$ represents hydrogen, chlorine or lower alkyl; $R_2$ represents hydrogen, lower alkyl or phenyl; X represents chlorine or fluorine; B represents —NR′—CO—
—NR′—SO$_2$—, —NR′—COCH=CH— or
NR′—CO—CHR—CHR′—

R′ being hydrogen or lower alkyl; and $n$ is an integer from 1 to 5.

2. The dyestuff of the formula

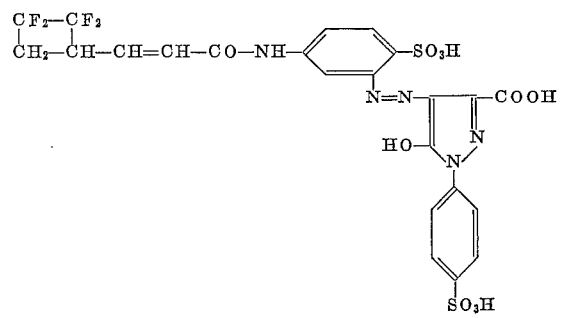

3. The dyestuff of the formula

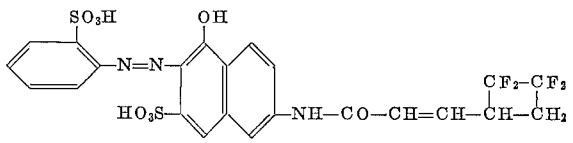

4. The dyestuff of the formula

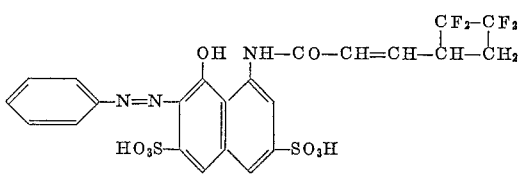

5. The dyestuff of the formula

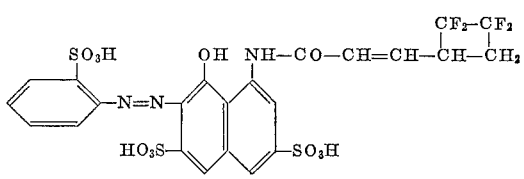

6. The dyestuff of the formula

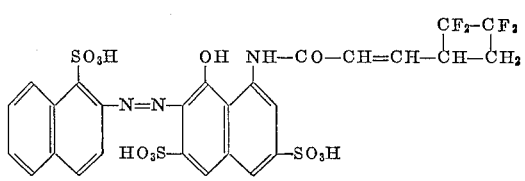

References Cited by the Examiner
UNITED STATES PATENTS
2,700,686   1/1955   Dickey et al. _____ 260—196 X CHARLES B. PARKER, *Primary Examiner.*
FLOYD D. HIGEL, *Assistant Examiner.*